United States Patent
Boylan

(10) Patent No.: US 7,332,450 B2
(45) Date of Patent: Feb. 19, 2008

(54) WATERBORNE HYDROPHOBIC BARRIER COATINGS DERIVED FROM COPOLYMERS OF HIGHER VINYL ESTERS

(75) Inventor: John Richard Boylan, Bethlehem, PA (US)

(73) Assignee: Air Products Polymers, L.P., Allentown, PA (US)

( * ) Notice: Subject to any disclaimer, the term of this patent is extended or adjusted under 35 U.S.C. 154(b) by 340 days.

(21) Appl. No.: 10/621,769

(22) Filed: Jul. 17, 2003

(65) Prior Publication Data

US 2004/0102114 A1  May 27, 2004

Related U.S. Application Data

(63) Continuation-in-part of application No. 10/304,312, filed on Nov. 26, 2002, now abandoned.

(51) Int. Cl.
  *B32B 5/18* (2006.01)
  *B32B 5/02* (2006.01)
  *C08J 3/22* (2006.01)
  *C08L 31/00* (2006.01)

(52) U.S. Cl. .......... 442/76; 442/90; 442/100; 442/85; 442/86; 524/487; 524/560; 524/563

(58) Field of Classification Search .......... 442/59, 442/85, 93, 100, 86, 76, 90; 524/478, 479, 524/487, 560, 563
See application file for complete search history.

(56) References Cited

U.S. PATENT DOCUMENTS

| | | | |
|---|---|---|---|
| 3,369,932 A * | 2/1968 | Sawyer, Jr. et al. | 427/374.4 |
| 3,394,097 A | 7/1968 | Bissot | |
| 3,713,878 A | 1/1973 | Thomas | |
| 3,912,674 A | 10/1975 | Stahl | |
| 4,062,818 A | 12/1977 | Mate | 260/17 |
| 5,314,530 A | 5/1994 | Wierer et al. | |
| 6,251,210 B1 | 6/2001 | Bullock et al. | 156/272.2 |
| 6,476,136 B1 * | 11/2002 | Swarup et al. | 525/191 |
| 2001/0021616 A1 | 9/2001 | Bullock et al. | 442/76 |
| 2002/0013560 A1 | 1/2002 | Erspamer et al. | 604/831 |

FOREIGN PATENT DOCUMENTS

| | | | |
|---|---|---|---|
| EP | 0 841 351 A2 | * | 5/1998 |
| EP | 1413668 A1 | | 10/2002 |
| EP | 1413669 A1 | | 4/2004 |
| GB | 876226 | | 8/1961 |
| GB | 1308045 | | 2/1973 |
| WO | WO94/14891 | * | 7/1994 |
| WO | 9814078 | | 4/1998 |
| WO | 03039852 | | 5/2003 |

OTHER PUBLICATIONS

Colbert, "Fluorochemicals—fluid repellency for nonwoven substrates", *TAPPI*, Sep. 1976, vol. 59, No. 9, pp. 129-131.
Knowlson, "Airlaid Products—Investment In The Future", *Nonwovens Industry*, Oct. 2001, pp. 34-36.
Collano AVE 191 Technical Data Sheet Apr. 2007.
Collano H 276 AV Technical Data Sheet Apr. 2007.

* cited by examiner

*Primary Examiner*—Lynda Salvatore
(74) *Attorney, Agent, or Firm*—Mary E. Bongiorno

(57) ABSTRACT

A blend comprising a paraffin wax emulsion and a polymer emulsion, wherein the polymer contains polymerized units of one or more $C_{1-12}$ ester of acrylic or methacrylic acid and a vinyl ester of a $C_{8-13}$ neo-acid. When the blend is applied as a coating to a substrate, such as a nonwoven web, a nonwoven absorbent pad, a nonwoven textile, or a textile fabric, and dried, it has a hydrostatic head barrier sufficient to prevent passage of aqueous fluids but allow passage of water vapor through it. A multi-layer material comprising at least one layer of a nonwoven web, an absorbent pad, or a textile, and at least one layer of the above described blend.

8 Claims, No Drawings

WATERBORNE HYDROPHOBIC BARRIER COATINGS DERIVED FROM COPOLYMERS OF HIGHER VINYL ESTERS

CROSS REFERENCE TO RELATED APPLICATIONS

This is a continuation-in-part of patent application Ser. No. 10/304,312, filed on Nov. 26, 2002 now abandoned.

BACKGROUND OF THE INVENTION

Barrier coatings and barrier layers are used in a variety of applications; for example absorbent materials, nonwovens, textiles and paper. They are particularly important in absorbent materials where the barrier coating or barrier layer prevents any of the absorbed liquid from penetrating the side opposite of the absorbent surface. This is important for such products as absorbent pads, disposable childrens bibs, and medical hygiene products. Barrier coatings are also important for monolithic substrates where the coated substrate is used to prevent aqueous liquid penetration, thus protecting adjacent surfaces.

Absorbent materials are typically multi-layered in construction and can comprise a liquid-permeable cover sheet having one side designed for placement in contact with the wearer or food, an absorbent section, and an impervious backsheet. Polyolefin film such as polyethylene or polyproplyene-films are typically used as a backsheet for absorbent pads because it prevents passage of aqueous fluids to the opposite side of the film. In some cases, the polyolefin film is perforated in such a way as to allow water vapor to pass through the film but inhibits the passage of aqueous fluids. However, there are drawbacks to the use of polyethylene film for absorbent pads. For example, it is sometimes difficult to place and attach the polyethylene film to a substrate, creating waste when it skews off the substrate during secondary operations. In some cases, application of an adhesive, such as a hot melt adhesive, or some other method of attachment is needed to keep the polyethylene film in place. Also, the polyethylene film needs to be applied in a secondary operation that is separate from the production of the absorbent pad, textile or nonwoven. A more practical substitute for the polyethylene backsheet would therefore benefit the industry.

Examples of coatings used as water repellents are:

Colbert ("Fluorochemicals—fluid repellency for nonwoven substrates" (*TAPPI*, September 1976, Vol. 59, No.9, pages 129-131)) discloses the use of fluorochemicals to provide fluid repellency to nonwoven substrates without the formation of continuous film barriers.

U.S. Pat. No. 4,062,818 (Mate, 1977) discloses an aqueous composition which imparts both flame resistance and water repellency properties to nonwoven textiles. The composition contains a poly(vinyl acetate), a chloro- or bromo-substituted phosphate plasticizer, a polyfluoroalkyl polyacrylate, water repellent, and an inorganic, water soluble salt.

U.S. Pat. No. 3,912,674 (Stahl, 1975) discloses a water repellent coating made up of an ethylene ionic copolymer, a paraffin wax, and a terpolymer of vinyl acetate, ethylene, and N-methylol acrylamide. The ethylene copolymer dispersion is held in dispersed phase by means of an amine soap surfactant.

WO98/14078 (Baumann, et al., 1998) discloses a face mask that allows gas to pass through while inhibiting passage of liquid through it. The mask includes a face-contacting layer, an outer cover layer, a polymeric microfiber mat disposed between the face-contacting layer and the outer cover sheet, and a non-woven fibrous mat disposed between the face-contacting layer and the outer cover sheet. The non-woven fibrous mat includes polymeric fibers and a surface energy reducing agent, such as a fluorochemical, a wax, a silicon or a combination thereof.

US 2001/0021616 A1 and U.S. Pat. No. 6,251,210 B1 (Bullock et al, 2001) disclose a method of preparing a stain resistant and water repellant textile fabric in which the fabric is first treated with a fluorochemical textile treatment composition and dried at elevated temperature. The treated fabric is then provided with a polymeric film to one side of the treated fabric and dried again at elevated temperature. A detackifying wax may be part of the secondary treatment composition.

BRIEF SUMMARY OF THE INVENTION

This invention is directed to a coating formulation comprising a blend of a paraffin wax emulsion and a polymer emulsion comprising a polymer comprised of polymerized units of one or more $C_{1-12}$ esters of acrylic or methacrylic acid and a vinyl ester of a $C_{8-13}$ neo-acid. The coating formulation, when applied to a substrate, such as an absorbent pad or a nonwoven web, and dried, has a hydrostatic head barrier sufficient to prevent passage of aqueous fluids but allow passage of water vapor through it. The coating might be used to replace the backsheet in absorbent medical hygiene products, such as bed pads and nonwoven medical garments, and absorbent pads for food products that exude fluid. The coating may also be used in other applications, such as textile fabrics, that require a water barrier to prevent penetration of water or other aqueous fluids but allow the escape of water vapor. Another use of the coating is in paper products where the coating prevents aqueous fluid from penetrating through the paper. This invention is also directed to a multi-layer material and a method of making the multi-layer material, wherein the multi-layer material comprises at least one layer of a nonwoven web, an absorbent pad, a textile fabric, or a nonwoven textile, and at least one layer of a blend of a paraffin wax emulsion and a polymer emulsion comprising a polymer comprised of polymerized units of one or more $C_{1-12}$ esters of acrylic or methacrylic acid and a vinyl ester of a $C_{8-13}$ neo-acid. The blend, after drying, has a hydrostatic head barrier sufficient to prevent passage of aqueous fluids through it but allow passage of water vapor.

An embodiment of this invention is a multi-layer material comprising:
  (a) at least one layer of a substrate, such as a nonwoven web, an absorbent pad, a textile fabric, or a nonwoven textile; and
  (b) at least one layer of a coating formulation comprising a blend of a paraffin wax emulsion of a polymer emulsion comprising a polymer comprised of polymerized units of one or more $C_{1-12}$ esters of acrylic or methacrylic acid and a vinyl ester of a $C_{8-13}$ neo-acid;
  said coating formulation, after drying, having a hydrostatic head barrier sufficient to prevent passage of aqueous fluids through it, but allow passage of water vapor.

Another embodiment of this invention is a method for making a multi-layer material which has a hydrostatic head barrier sufficient to prevent passage of aqueous fluids through it, but allow passage of water vapor, comprising:
  (a) providing a substrate, such as a nonwoven web, an absorbent pad, a textile fabric, or a nonwoven fabric;

(b) providing a coating formulation comprising a blend of a paraffin wax emulsion of a polymer emulsion comprising a polymer comprised of polymerized units of one or more $C_{1-12}$ esters of acrylic or methacrylic acid and a vinyl ester of a $C_{8-13}$ neo-acid;

(c) applying the coating formulation blend onto the substrate; and (d) drying the coating formulation.

Some of the advantages of the coating formulation of this invention are:

- it can be applied directly to a substrate, eliminating the need for a separate backsheet;
- it attaches directly to a substrate, eliminating the need for an additional procedure to attach a backsheet;
- it is stable at a pH of 8.5 or greater and at temperatures below 140° F. (60° C.);
- it has low viscosity, making it easily pumped and transferred;
- it has excellent foam when a foaming surfactant is part of the formulation;
- when used for coating a nonwoven, the nonwoven has a soft hand feel;
- it contains low (i.e., <50 ppm) free formaldehyde; and
- it has no blocking tendencies in the finished coated nonwoven roll.

DETAILED DESCRIPTION OF THE INVENTION

The coating formulation of this invention comprises a blend of a paraffin wax emulsion and a polymer emulsion comprised of a polymer having polymerized units of one or more $C_{1-12}$ esters of acrylic or methacrylic acid and a vinyl ester of a $C_{8-13}$ neo-acid. The blend comprises 10 to 90 wt % paraffin wax emulsion and 10 to 90 wt % of a polymer emulsion comprised of a polymer having polymerized units of one or more $C_{1-12}$ esters of acrylic or methacrylic acid and a vinyl ester of a $C_{8-13}$ neo-acid, based on the total weight of the blend.

Typical paraffin waxes have melt point temperatures of 114 to 160° F. (46 to 71° C.). Solids of the final paraffin wax emulsion can vary from 25% to 60%; more typically, 35 to 55%. The pH of the emulsion can range from 8 to 10, typically 8.9 to 9.8, but is dependent on the process used. The final particle size is dependent on a number of variables including the homogenization which is used at the end of the process. Particle size of the paraffin wax emulsion can vary between 0.02 to 1.5 microns. The particle size for paraffin wax alone is typically 0.2 to 0.8 microns. The paraffin wax emulsion can also be a blend of paraffin wax with other materials, such as polyethylene wax, carnauba wax, or ethylene acrylic acid. Examples of blends from Michaelman Inc. Michem emulsion 62330, a blend of paraffin wax and polyethylene, Michem emulsion 34935, a blend of paraffin wax and ethylene acrylic acid, and Michem Lube 180, a commercial blend of paraffin wax and carnauba wax.

The paraffin wax emulsion can be prepared by melting refined paraffin wax to a temperature above the melting point of the paraffin. Appropriate emulsifiers, such as stearic acid, oleic acid, diethylamine ethanol, 2-amino-2-methyl-1-propanol, can then be stirred into the wax emulsion at the elevated temperature. A base, such as potassium hydroxide or ammonium hydroxide, can then be dissolved in ethylene glycol or water at elevated temperatures and slowly added to the wax blend while increasing agitation speed of the mixer. After all the water/base mixture has been added to the molten wax, the resulting wax in water emulsion can be passed through a homogenizer to further adjust particle size of the emulsion. After homogenization, the resulting emulsion is cooled, for example, through a heat exchanger, and then filtered and packaged. Michem ME 70950 or Michem ME 71450, supplied by Michelman Inc, are examples of a commercially available paraffin wax emulsion that can be used in the blend of this invention.

The polymers in the polymer emulsion of this invention are typically derived from the following monomers and within the percentage proportions listed below, based on total weight of monomers in polymer:

(a) 5-40 wt % of a vinyl ester of a $C_{8-13}$ neo-acid, preferably 15 to 30 wt %;

(b) 30-80 wt % of a $C_{1-12}$ alkyl ester of acrylic or methacrylic acid, preferably 40 to 70 wt %;

(c) 0-20% wt % of a vinyl ester of saturated aliphatic acids, preferably 0 to 10%;

(d) 0-30 wt % ethylene, styrene or butadiene, preferably 0 to 20 wt %;

(e) 0-20 wt % di-($C_{1-13}$)alkyl maleate/fumarate, preferably 0 to 10 wt %;

(f) 0-5 wt % of a hydroxyalkyl (meth)acrylate;

(g) 0-5 wt % (meth)acrylamide; and, (h) 0-10 wt % alpha, beta-ethylenically unsaturated monocarboxylic acid.

A variety of other comonomers, e.g., other ethylenically unsaturated monomers sometimes employed in the formation of the aqueous based pressure sensitive emulsions can be copolymerized with the vinyl ester of a neo-acid. For example, $C_{1-8}$ alkyl vinyl ethers, vinyl chloride, vinylidene chloride, nitriles, carboxylic amides such as N-vinylformamide and N-vinylacetamide, acrylonitrile and methacrylonitrile to produce a variety of polymers. Examples of useful alkyl vinyl ethers are methyl vinyl ether, ethyl vinyl ether, isopropyl vinyl ether, n-propyl vinyl ether, tert-butyl vinyl ether and n-butyl and isobutyl vinyl ether.

Component (a) monomers which are the vinyl esters of $C_{8-13}$ neo-acids are comprised of the vinyl ester of a single or mixture of tri- and tetramers of propylene which have been converted to the corresponding single or mixture of $C_{8-13}$ neo-acids. The esters typically are prepared by first converting the tri and tetramers of propylene to the corresponding acids and then converting the corresponding neo-acids to the vinyl esters. The vinylation of those acids can be achieved either by transvinylation with vinyl acetate or by catalytic addition of the neo-acids to acetylene. Some of the vinyl esters may be represented by a singular flea-acid, but generally the vinyl esters of the neo-acids are present as a mixture.

Component (b) monomers are alkyl esters of acrylic or methacrylic acid. These are esters of acrylic acid or methacrylic acid and a $C_{1-12}$ alcohol. Examples of suitable alcohols for the preparation of these esters are methanol, ethanol, propanol, isopropanol, n-, iso- and tert-butyl alcohol, neopentyl alcohol, 2-ethyl-hexanol, n-octanol, dodecanol, palmityl alcohol and stearyl alcohol. Specific examples of unsaturated alkyl acrylate monomers include methyl methacrylate, ethyl acrylate, butyl acrylate, hexyl acrylate 2-ethylhexyl acrylate, isooctyl acrylate, isodecyl acrylate and the like.

Component (c) monomers can include other vinyl esters than the vinyl esters of neo-acids. Some of the more common vinyl esters used in the polymer synthesis include $C_{3-18}$ alkanoic acids, such as vinyl acetate, vinyl propionate, vinyl butyrate, vinyl laurate and the like. These esters, and particularly the lower alkyl esters, may detract from the overall properties of the pressure sensitive emulsion imparted by the vinyl ester of the $C_{8-13}$ neo-acids.

Component (d) monomers can include hydrocarbon monomers such as ethylene, styrene, butadiene.

Component (e) monomers include an alkyl maleate or fumarate. One may suitably use the diesters of maleic acid or fumaric acid, the diester being formed by the reaction of the acid with a $C_{1-13}$ alcohol, such as, n-octyl alcohol, isooctyl alcohol, butyl alcohol, isobutyl alcohol, methyl alcohol, amyl alcohol and the like. Preferably a $C_{4-8}$ alcohol is employed.

Components (f) monomers can include hydroxyethyl acrylate, hydroxyethyl methacrylate, hydroxypropyl acrylates, hydroxypropyl methacrylate, hydroxypropyl acrylates, hydroxypropyl methacrylates, hydroxybutyl acrylates and hydroxybutyl methacrylates.

Component (g) monomers can include acrylamide, methacrylamide and N-methylol acrylamide.

Component (h) monomers can be methacrylic acid, crotonic acid, acrylic acid and the like.

The sum of the monomers in the copolymers is 100 wt %. The copolymers in the aqueous emulsions are designed to have a $T_g$ of less than $-15°$ C., preferably $-15$ to $-70°$ C. and typically $-20$ to $-50°$ C. The aqueous emulsions contain about 40 to 70 wt % solids. An example of a commercially available polymer emulsion as described above is FLEX-CRYL® AV 3200 acrylic polymer emulsion.

Preparation of the copolymers has been described in U.S. Pat. No. 6,084,024 which is hereby incorporated by reference. The emulsion polymerization process typically involves an initial homogenization in which the monomers which include the vinyl esters of neo-acids and the other monomers which are employed to form the vinyl copolymer such as $C_{1-12}$ alkyl acrylates or methacrylates, vinyl acetate, dialkyl maleate/fumarate, ethylene, acrylamide and other monomers are thoroughly agitated. If ethylene is added to the reactor to form a copolymer, the reactor is pressurized to the working pressure to effect solution of the ethylene in the monomers. Then, the reaction medium is gradually heated to polymerization temperature. The homogenization period is followed by a polymerization period during which the free radical source is added incrementally.

Various free-radical forming catalysts such as peroxide compounds can be used in carrying out the emulsion polymerization of the monomers. Combination-type catalysts employing both reducing agents and oxidizing agents can also be used. The use of this type of combined catalyst is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts, and tertiary aromatic amines, e.g., N,N-dimethylaniline. The oxidizing agents or initiators include hydrogen peroxide, organic peroxides such as benzoyl peroxide, t-butyl hydroperoxide (t-bhp) and the like, persulfates, such as ammonium or potassium persulfate, perborates, and the like. A specific combination-type catalyst or redox system which can be used is hydrogen peroxide and sodium formaldehyde sulfoxylate.

The initiator is employed in the amount of 0.1 to 2%, preferably 0.25 to 0.75%, based on the weight of monomers introduced into the reactor. The activator is ordinarily added as an aqueous solution and the amount of activator is generally from 0.25 to 1 times the amount of initiator.

A wide variety of nonionic, anionic and cationic surfactants can be used to stabilize the emulsion in emulsion polymerization processes. Suitable nonionic emulsifying agents include polyoxyethylene condensates. Polyoxyethylene condensates may be represented by the general formula: $R(CH_2-CH_2-O)_nH$, where R is the residue of a fatty alcohol containing 10-18 carbon atoms, an alkylphenol, a fatty acid containing from 10-18 carbon atoms, an amide, an amine, or a mercaptan, and where n is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thioether. Other suitable nonionic surfactants are alkylarylethoxylate alcohols, alkylethoxylate alcohol, ethoxypropoxylate, alcohols from ethylene oxide and/or propylene oxide reaction products, and the like.

Another class of nonionic surfactants are sold under the Igepal tradename. One example within this class is a polyoxyethylene nonylphenyl ether having a cloud point of between 126 and 133° F. and marketed as "Igepal CO-630"; another is polyoxyethylene nonylphenyl ether having a cloud point above 212° F. and marketed as "Igepal CO-887."

Examples of anionic surfactants include metal or ammonium salts of long chain alkyl sulfates and the likes; metal or ammonium salts of alkylarylethoxylated sulfates or sulfonates, paraffin sulfonates, alkyl sulfosuccinates, alkylarylsulfonates, and alkyl phosphates.

A protective colloid also can be used in the polymerization mixture as a stabilizing agent. Various colloids and amounts conventionally used in emulsion polymerization can be incorporated into the latices as desired and in combination with the surfactants. Representative colloids which can be used include poly(vinyl alcohol), partially-acetylated poly(vinyl alcohol), e.g., up to 50% acetylated, casein, hydroxyethyl starch, carboxymethylcellulose, gum arabic, and the like.

The concentration range of the total amount of emulsifying agents used in emulsion polymerization is from 0.1 to 10% based on the aqueous phase of the latex regardless of the solids content. The stabilizers employed are, in part, governed by the use to which the copolymer latex is to be put. By utilizing appropriate levels of surfactant and/or protective colloid, one can obtain latex polymer particles having a variety of average particle size ranges and distributions.

In order to maintain the pH of the system at the desired value, there is suitably added a buffering agent of any convenient type. Any alkaline material which is compatible with the stabilizing agent can be used as the buffer. The amount of buffer is that sufficient to adjust the pH of the system within the desired range, e.g., 2.5 to 10 and preferably 3.5 and 8.5. The amount of buffer is generally about 0.1 to 0.5% by weight, based on the monomers.

Reaction temperatures for emulsion polymerizing the vinyl esters of neo-acids along with other monomers are conventional. The reaction temperature can be controlled by the rate of catalyst addition and by the rate of the heat dissipation therefrom. Generally, it is advantageous to maintain a temperature from about 50 to 90° C. While temperatures as low as 0° C. can be used, economically, the lower temperature limit is about 40° C.

The reaction time will also vary depending upon other variables such as the temperature, the catalyst, and the desired extent of the polymerization. It is generally desirable to continue the reaction until less than 0.1% of the vinyl ester remains unreacted. Under these circumstances, a reaction time of about 4 hours has been found to be generally sufficient for complete polymerization, but reaction times ranging from 2 to 10 hours have been used, and other reaction times can be employed, if desired.

The blend can contain other components such as pigments which may improve opacity or color; water soluble polymers or protective colloids, such as poly(vinyl alcohol) and hydroxyethyl cellulose, which may improve fiber bonding and aid in emulsion stability; and hydrophobic additives, such as fluoro surfactants, which may improve the hydrophobic character of the coating. Examples of fluoro surfactants are the perfluoroalkyl acrylic copolymers sold under the tradename Zonyl 8300 or Zonyl 7040, supplied by DuPont. It can also contain urea which is used to scavenge free formaldehyde in the emulsion and reduce free formaldehyde as contributed by the dried coating on the finished coated nonwoven web.

Representative blends are described in the following table:

| Component | Broad % dry wt (solids) | Preferred % dry wt (solids) |
|---|---|---|
| Polymer Emulsion | 10–90 | 20–80 |
| Paraffin Wax Emulsion | 10–90 | 20–80 |
| Water Soluble Polymer or Protective Colloid | 0–80 | 0–10 |
| Fluoro Surfactant | 0–5 | 0–3 |
| Other components | 0–10 | 0–5 |
| Total | 100 | 100 |

Representative properties of the blends are summarized in the following table:

| Property | Broad Range | Preferred Range |
|---|---|---|
| Dry Solids | 25–60% | 35–55 |
| Viscosity (cps)* | 40 to 150 | 50–100 |
| pH | 8–10 | 8.5–9 |

*Measured with Brookfield Viscometer, Model RV @ 60 rpm; #3 spindle; 20° C.

The polymer emulsion and the paraffin wax emulsion can be blended together by well known methods, such as the following method:

Add an appropriate amount of polymer emulsion to a blending vessel;

Mix in a correct amount of dilution water to form the targeted solids;

Adjust pH, under agitation, with ammonium hydroxide;

Under agitation, slowly add the appropriate amount of paraffin wax emulsion;

Optionally add, under agitation, other components; and

Continue agitation until ingredients are well blended.

An example of a substrate to which the coating formulation is applied is a nonwoven fiber web in a single layer or multiple layers. The nonwoven web can be 100% cellulosic web, a blend of synthetic fibers and cellulosic fibers, or all synthetic fibers, such as polyethylene, polypropylene, polyester, and polyamide fibers. The webs can be formed by a dry process, such as air-laid, carded, and rando, or by a wet process. A 100% synthetic web can also be produced through a spun laid or melt blown process or made by a combination of processes. Examples of other substrates include textiles that require a hydrophobic coating that prevents penetration of aqueous fluids but allows transmission of water vapor; such as, disposable protective work garments, medical garments, and tablecloths.

The coating formulations of this invention can be applied as a coating to a substrate using well know coating techniques; for example, spraying, saturation, foam application, print application, and roll application. Coat weights typically range from 5 to 30 g/m² of substrate.

Hydrostatic barrier properties are measured in order to determine the effectiveness of the coating in preventing penetration of aqueous fluids through the coating. Hydrostatic barrier properties can be measured according to European Disposables and Nonwovens Association (EDANA) Test Method ERT.120.1-80, Repellency/Wet Barrier Hydrostatic Head Test. When the blend of this invention is applied as a coating to a substrate and dried, the coated substrate will exhibit a hydrostatic head barrier of at least 30 mm, preferably at least 60 mm, using EDANA Test Method ERT.120.1-80, in order to be effective as a barrier coating.

The invention will be further clarified by a consideration of the following examples, which are intended to be purely exemplary of the use of the invention. The coating composition as illustrated above was coated on to a nonwoven substrate via a foam coating application. The steps to foaming and coating the nonwoven substrate are as follows:

Foaming

1. To 200 g of the coating was added 2 g of a foaming surfactant such as Unifroth 0520 from Unichem, Inc.
2. The mixture was poured into the bowl of a Hobar Whisk mixer and the mixer was set on high speed.
3. The coating mixture was whisked for 3 minutes or until the foam reached the top of the bowl.
4. A sample of the foamed coating was taken for foam density and foam stability Foam Coating Application and Coating Add-on Determination 1. A pre-weighed sheet of nonwoven substrate was taped at the top to a level glass surface.
2. An excess of foam was layered across the top of nonwoven substrate.
3. The foam was rolled down the surface of the nonwoven with a rolling pin.
4. The substrate with the coating was then turned 900 and the coated surface was again rolled.
5. The coated substrate was then placed under an IR lamp for 1 minute to dry the coating.
6. The dried substrate was then place in a forced air oven at 320° F. (160° C.) for three minutes to insure complete drying.
7. After drying, the coated substrate was re-weighed and the coating add-on was determined by subtracting the weight of the coated substrate from the weight of the uncoated substrate.

Determination of Hydrostatic Head Barrier Properties

The hydrostatic head barrier properties of the coated nonwoven substrates were determined using the EDANA Modified Hydrostatic Head test (EDANA Test Method ERT.120.1-80.)

Determination of Water Vapor Transmission Rate (WVTR)

The water vapor transmission rate of the coated nonwoven substrates was determined using TAPPI Standard T 448 om-89.

EXAMPLE 1

Hydrostatic Head Test

The formulation tested was as follows:

| Component | % of Dry Solids |
| --- | --- |
| FLEXCRYL AV 3200 acrylic polymer emulsion | 80 |
| Michem ® 34935 paraffin/ethylene acrylic acid emulsion | 15 |
| Zonyl ® 7040 fluoro polymer | 5 |

The components of the formulation were tested individually and in various combinations for hydrostatic barrier properties on a nonwoven cellulosic substrate. The components were formulated at the levels described except that water was used to replace the other components in the formulation when the particular composition did not contain a particular ingredient (i.e. if Zonyl was the component being tested then the Flexcryl AV 3200 and Michem 34935 additions were replaced on a weight basis with water). Urea was left out of the formulation since it does not provide or detract from the functional properties being tested. The results are presented in Table 1.

TABLE 1

| Coating Component(s) | Coat weight g/m² | Hydrostatic Head Resistance (mm) |
| --- | --- | --- |
| Uncoated substrate | 0 | 0 (complete soak through) |
| FLEXCRYL AV3200 polymer emulsion | 35 | 58 |
| Michem 34935 paraffin emulsion | 2 | 0 (complete soak through) |
| Zonyl 7040 fluoro polymer | 2 | 20 |
| Flexcryl AV3200/ Michem 34935 | 37 | 53 |
| Flexcryl AV3200/ Zonyl 7040 | 45 | 81 |
| Flexcryl AV3200/ Michem 34935/ Zonyl 7040 | 24 | 77 |

The results show that the substrate by itself had no resistance to water and thus yielded a 0 mm measurement on the hydrostatic head. The substrate was foam coated with Flexcryl AV 3200 polymer emulsion which provided a hydrostatic head level of 58 mm. When the substrate was foam coated with the Michem 34935 paraffin emulsion by itself, it did not provide a hydrostatic head resistance. The substrate which was foam coated with Zonyl 7040 fluoro polymer provides a slight hydrostatic head resistance when used by itself (20 mm). The most favorable hydrostatic results where obtained from a coating consisting of a blend of Flexcryl AV3200 and Zonyl 7040 or a coating consisting of a blend of Flexcryl AV3200, Zonyl 7040 and Michem 34935. Substrates that were foam coated with these two blends provided hydrostatic head results of 81 and 77 mm, respectively.

EXAMPLE 2

In this example, the amount of components in Example 1 were varied. The results of this experiment, presented in Table 2, demonstrated that a reduced level of the fluorochemical was possible.

TABLE 2

| Sample | % Flexcryl AV3200 polymer emulsion | % Michem 34935 paraffin emulsion | % Zonyl 7040 fluoro polymer | Coat Weigh Applied (g/m²) | Hydrostatic Head Resistance (mm) |
| --- | --- | --- | --- | --- | --- |
| 1 | 82.0 | 8.0 | 10.0 | 67 | 79 |
| 2 | 75.0 | 15.0 | 10.0 | 31 | 78 |
| 3 | 86.5 | 8.0 | 5.5 | 83 | 93 |
| 4 | 89.0 | 1.0 | 10.0 | 71 | 74 |
| 5 | 79.5 | 15.0 | 5.5 | 38 | 83 |
| 6 | 86.5 | 8.0 | 5.5 | 70 | 93 |
| 7 | 84.0 | 15.0 | 1.0 | 49 | 83 |
| 8 | 86.5 | 8.0 | 5.5 | 72 | 82 |
| 9 | 93.5 | 1.0 | 5.5 | 64 | 87 |
| 10 | 98.0 | 1.0 | 1.0 | 84 | 79 |
| 11 | 91.0 | 8.0 | 1.0 | 72 | 79 |
| 12 | 90.9 | 9.1 | 0.0 | 57 | 69 |

EXAMPLE 3

In this example, the amount of Zonyl 7040 fluoro polymer in Example 1 was reduced in order to determine the minimum amount needed in the formulation. The results presented in Table 3 below demonstrated that as little as 0.25% of the fluorochemical would provide good hydrostatic barrier resistance.

TABLE 3

| Sample | % Flexcryl AV3200 emulsion polymer | % Michem 34935 paraffin emulsion | % Zonyl 7040 fluoro polymer | Coat Weigh Applied (g/m²) | Hydrostatic Head Resistance (mm) |
| --- | --- | --- | --- | --- | --- |
| 1 | 85.0 | 15.0 | 0 | 20 | 53 |
| 2 | 84.75 | 15.0 | 0.25 | 33 | 72 |
| 3 | 84.5 | 15.0 | 0.50 | 26 | 69 |
| 4 | 84.25 | 15.0 | 0.75 | 19 | 70 |
| 5 | 84.0 | 15.0 | 1.00 | 20 | 78 |

Based on this example a preferred formulation is:

| Component | % of Dry Solids |
| --- | --- |
| Flexcryl AV3200 polymer emulsion | 84.25% |
| Michem 34935 paraffin emulsion | 15.00% |
| Zonyl 8300 fluoro polymer | 00.75% |

Zonyl 8300 fluoro polymer has a better flammability rating than Zonyl 7040 fluoro polymer and contains the same type of functional perfluoroalkyl acrylic copolymer.

EXAMPLE 4

The following formulation and each individual component and combination of components were evaluated for hydrostatic head barrier resistance.

| Component | % of Dry Solids |
| --- | --- |
| Flexcryl AV3200 polymer emulsion | 84.25% |
| Michem 34935 paraffin emulsion | 15.00% |
| Zonyl 8300 fluoro polymer | 00.75% |

The results (presented in Table 4) demonstrate that the components individually provide a low level of hydrostatic head barrier performance. The combination of the Flexcryl AV3200 and fluorochemical provided the best results and were equivalent in hydrostatic head resistance to the combination of all three ingredients.

TABLE 4

| Coating Component(s) | Coat weight g/m² | Hydrostatic Head Resistance (mm) |
|---|---|---|
| Uncoated substrate | 0 | 0 (complete soak through) |
| Flexcryl AV3200 polymer emulsion | 24 | 58 |
| Michem 34935 paraffin emulsion | 4 | 8 (complete soak through) |
| Zonyl 7040 fluoro polymer | 2 | 5 |
| Flexcryl AV3200/ Michem 34935 | 24 | 65 |
| Flexcryl AV3200/ Zonyl 7040 | 45 | 81 |
| Flexcryl AV3200/ Michem 34935/ Zonyl 7040 | 24 | 77 |

EXAMPLE 5

Spray Application of the Formulation

In this example, a coating formulation as described in Table 5 was spray applied to a cellulosic airlaid nonwoven substrate at a solids level of 15 to 20%. The coating was dried in a through air oven at 320° F. for 3 minutes to insure complete dryness of the coating. The coat weight and the hydrostatic head of the coated substrate were measured. The data in Table 6 show that spray application results in a coating with good hydrostatic head resistance.

TABLE 5

Spray Coating Composition as a % of the Dry Coating Solids

| Sample | % Flexcryl AV3200 polymer emulsion | % Michem 70950 paraffin emulsion | % Zonyl 8300 fluoro polymer | % Urea | Coat Weight (g/m²) | Hydrostatic Head Resistance (mm) |
|---|---|---|---|---|---|---|
| 1 | 47.00 | 50.00 | 0 | 3.0 | 14.9 | 101 |
| 2 | 57.00 | 40.00 | 0 | 3.0 | 14.8 | 94 |
| 3 | 67.00 | 30.00 | 0 | 3.0 | 15.4 | 90 |
| 4 | 57.00 | 39.25 | 0.75 | 3.0 | 15.2 | 104 |
| 5 | 96.25 | 0 | 0.75 | 3.0 | 21.9 | 93 |
| 6 | 47.00 | 39.5 | 0.50 | 3.0 | 19.4 | 107 |

EXAMPLE 6

Moisture Vapor Transmission Rates

In this example the Water Vapor Transmission capability of the coating composition after foam application on a nonwoven cellulosic substrate was measured. The results, presented in Table 6, show the coating did not interfere with the water vapor transmission rate of the substrate and was similar to the uncoated substrate.

TABLE 6

| Sample | Coat weight, g | Condition | Water Vapor Transmission Rate, g/m²/day |
|---|---|---|---|
| Base sheet | 0 | 100° F. (38° C.) | 2944.6 |
| AV3200/Michem 34935 Zonyl 8300 | 26.9 | 100° F. (38° C.) | 3041.7 |
| Base sheet | 0 | CTH 77° F. (25° C.) & 50% RH | 496.0 |
| AV3200/Michem 34935 Zonyl 8300 | 26.9 | CTH 77° F. (25° C.) & 50% RH | 540.0 |

CTH = constant temperature and humidity; RH = relative humidity

A further attribute of the Michem 34935 or Michem 70950 formulation is the block resistance provided by the paraffin wax portion of the emulsion. Without Michem 34935 or Michem 70950, the resulting nonwoven fabric is tacky to the touch due to the low Tg of the acrylic Flexcryl AV3200 polymer. The tacky surface could create a blocking situation in a roll of finished coated nonwoven where the coated side sticks to the adjacent uncoated side of the nonwoven. Paraffin wax of the emulsion prevents blocking from occurring.

What is claimed is:

1. A blend for use as a barrier coating on a substrate, wherein the barrier coating provides a hydrostatic head barrier sufficient to prevent passage of aqueous fluids but allow passage of water vapor through said barrier coating, said blend comprising a paraffin wax emulsion and a polymer emulsion, said polymer emulsion comprising a polymer containing polymerized units of one or more $C_{1-12}$ esters of acrylic or methacrylic acid and a vinyl ester of a $C_{8-13}$ neo-acid obtained from a single or mixture of tri- and tetramers of propylene, the polymer having a $T_g$ of −15 to −70° C.

2. The blend of claim 1 wherein the polymer has polymerized units of:
   (a) 5-40 wt % of a vinyl ester of a $C_{8-13}$ neo-acid;
   (b) 30-80 wt % of a $C_{1-12}$ alkyl ester of acrylic acid or a $C_{1-12}$ alkyl ester of methacrylic acid;
   (c) 0-20% wt % of a vinyl ester of a saturated aliphatic acid;
   (d) 0-30 wt % ethylene, styrene or butadiene;
   (e) 0-20 wt % a di-($C_{1-13}$)alkyl maleate or a di-($C_{1-13}$) alkyl fumarate;
   (f) 0-5 wt % of a hydroxyalkyl acrylate or a hydroxyalkyl methacrylate;
   (g) 0-5 wt % acrylamide or methacrylamide; and,
   (h) 0-10 wt % of an alpha, beta-ethylenically unsaturated monocarboxylic acid, based on the total weight of monomers in the polymer.

3. The blend of claim 1 wherein the polymer has polymerized units of:
   (a) 15-30 wt % of a vinyl ester of a $C_{8-13}$ neo-acid;
   (b) 40-70 wt % of a $C_{1-12}$ alkyl ester of acrylic or a $C_{1-12}$ alkyl ester of methacrylic acid;
   (c) 0-10 wt % of a vinyl ester of a saturated aliphatic acid;
   (d) 0-20 wt % ethylene, styrene or butadiene;
   (e) 0-10 wt % a di-($C_{1-13}$)alkyl maleate or a di-($C_{1-13}$) alkyl fumarate;
   (f) 0-5 wt % of a hydroxyalkyl acrylate or a hydroxyalkyl methacrylate;
   (g) 0-5 wt % acrylamide or methacrylamide; and, (h) 0-10 wt % of an alpha, beta-ethylenically unsaturated monocarboxylic acid.

4. The blend of claim 1 wherein the hydrostatic head barrier is at least 60 mm.

5. The blend of claim 1 comprising, on a 100% dry weight solids basis:

| | |
|---|---|
| 10–90 wt % | Polymer Emulsion |
| 10–90 wt % | Paraffin Wax Emulsion |
| 0–80 wt % | Water Soluble Polymer or Protective Colloid |
| 0–5 wt % | Fluoro Surfactant |
| 0–10 wt % | Other components. |

6. The blend of claim 1 comprising, on a 100% dry weight solids basis

| | |
|---|---|
| 20–80 wt % | Polymer Emulsion |
| 20–80 wt % | Paraffin Wax Emulsion |
| 0–10 wt % | Water Soluble Polymer or Protective Colloid |
| 0–3 wt % | Fluoro Surfactant |
| 0–5 wt % | Other components. |

7. The blend of claim 1 wherein the polymer emulsion has a $T_g$ of $-20°$ C. to $-50°$ C.

8. The blend of claim 1 wherein the paraffin wax emulsion further comprises polyethylene wax, carnauba wax or ethylene acrylic acid.

* * * * *